United States Patent
Burbaum et al.

(10) Patent No.: US 10,646,956 B2
(45) Date of Patent: May 12, 2020

(54) METHOD FOR PRODUCING A COMPONENT, AND AN OPTICAL IRRADIATION DEVICE

(71) Applicant: Siemens Aktiengesellschaft, Munich (DE)

(72) Inventors: Bernd Burbaum, Falkensee (DE); Thomas Malow, Berlin (DE); Sebastian Piegert, Lübbenau (DE)

(73) Assignee: Siemens Aktiengesellschaft, Munich (DE)

( * ) Notice: Subject to any disclaimer, the term of this patent is extended or adjusted under 35 U.S.C. 154(b) by 240 days.

(21) Appl. No.: 15/030,961

(22) PCT Filed: Sep. 17, 2014

(86) PCT No.: PCT/EP2014/069820
§ 371 (c)(1),
(2) Date: Apr. 21, 2016

(87) PCT Pub. No.: WO2015/062784
PCT Pub. Date: May 7, 2015

(65) Prior Publication Data
US 2016/0250715 A1   Sep. 1, 2016

(30) Foreign Application Priority Data
Oct. 29, 2013 (EP) .................... 13190691

(51) Int. Cl.
*B23K 26/0622* (2014.01)
*B33Y 10/00* (2015.01)
(Continued)

(52) U.S. Cl.
CPC ........ *B23K 26/0624* (2015.10); *B22F 3/1055* (2013.01); *B23K 26/02* (2013.01);
(Continued)

(58) Field of Classification Search
CPC .. B23K 26/0624; B23K 26/342; B33Y 10/00; B33Y 30/00; B29C 64/153; B22F 3/1055
(Continued)

(56) References Cited

U.S. PATENT DOCUMENTS

| | | | | |
|---|---|---|---|---|
| 5,132,143 A | * | 7/1992 | Deckard | B23K 26/082 264/497 |
| 5,656,186 A | * | 8/1997 | Mourou | A61B 18/20 219/121.69 |
| 2003/0103108 A1 | * | 6/2003 | Liu | B23K 26/08 347/47 |
| 2009/0121393 A1 | * | 5/2009 | Abe | B22F 3/1055 264/497 |

(Continued)

FOREIGN PATENT DOCUMENTS

| CN | 102076456 A | 5/2011 |
|---|---|---|
| CN | 103358017 A | 10/2013 |

(Continued)

OTHER PUBLICATIONS

CN Office Action dated Sep. 30, 2016, for CN application No. 201480059843.7.

*Primary Examiner* — Tu B Hoang
*Assistant Examiner* — Erin E McGrath
(74) *Attorney, Agent, or Firm* — Beusse Wolter Sanks & Maire

(57) ABSTRACT

A method for producing a component by the successive solidification of individual layers of powdered, granular or liquid material by irradiation with laser radiation using a laser, each layer being divided into an inner region and an edge region with an edge region surface, and, for each layer, after irradiation with the laser, at least the edge region surface of the edge region of the layer being irradiated with an ultrashort pulse laser. An optical irradiation device produces a component by successive solidification of individual layers of powdered, granular or liquid material.

10 Claims, 1 Drawing Sheet

(51) Int. Cl.
*B33Y 30/00* (2015.01)
*B22F 3/105* (2006.01)
*B23K 26/06* (2014.01)
*B23K 26/02* (2014.01)
*B29C 64/153* (2017.01)
*B29C 64/135* (2017.01)
*B29C 64/20* (2017.01)
*B23K 26/144* (2014.01)
*B23K 26/342* (2014.01)

(52) U.S. Cl.
CPC ........ *B23K 26/0604* (2013.01); *B23K 26/144* (2015.10); *B23K 26/342* (2015.10); *B29C 64/135* (2017.08); *B29C 64/153* (2017.08); *B29C 64/20* (2017.08); *B33Y 10/00* (2014.12); *B33Y 30/00* (2014.12); *B22F 2003/1056* (2013.01); *Y02P 10/295* (2015.11)

(58) Field of Classification Search
USPC ....................................................... 219/76.12
See application file for complete search history.

(56) References Cited

U.S. PATENT DOCUMENTS

| | | |
|---|---|---|
| 2011/0135840 A1 | 6/2011 | Doye et al. |
| 2012/0138258 A1* | 6/2012 | Jonsson ................ B22F 3/1055 164/492 |
| 2012/0217226 A1 | 8/2012 | Bayer et al. |
| 2013/0142965 A1 | 6/2013 | Bruck et al. |
| 2013/0278920 A1* | 10/2013 | Loewgren ............. G01B 11/14 356/51 |
| 2015/0076739 A1* | 3/2015 | Batchelder ............ B33Y 10/00 264/401 |
| 2016/0001401 A1* | 1/2016 | Dimter ................. B22F 3/1055 219/76.12 |

FOREIGN PATENT DOCUMENTS

| | | |
|---|---|---|
| DE | 102007029052 A1 | 1/2009 |
| DE | 102011089336 A1 | 6/2013 |
| WO | 2006040280 A1 | 4/2006 |
| WO | 2008155021 A2 | 12/2008 |
| WO | 2013080030 A1 | 6/2013 |

\* cited by examiner

METHOD FOR PRODUCING A COMPONENT, AND AN OPTICAL IRRADIATION DEVICE

CROSS REFERENCE TO RELATED APPLICATIONS

This application is the US National Stage of International Application No. PCT/EP2014/069820 filed Sep. 17, 2014, and claims the benefit thereof. The International Application claims the benefit of European Application No. EP13190691 filed Oct. 29, 2013. All of the applications are incorporated by reference herein in their entirety.

FIELD OF INVENTION

The invention relates to a method for producing a component by successive solidification of individual layers of powdered, granular or liquid material by irradiation with laser radiation with the aid of a laser, each layer being divided into an inner region and an edge region with an edge region surface, as well as to an optical irradiation device.

BACKGROUND OF INVENTION

Generative manufacturing methods are used by their iterative joining of layer elements or volume elements onto or to one another in order to produce three-dimensional objects, and their application is found in the region of the production of prototypes as well as recently also in component production, particularly for the fabrication of individually shaped components. A multiplicity of different materials are available as starting materials, which may be in powder or granules form, but also in the form of liquids, for example as suspensions. In generative production methods, the three-dimensional object is formed by a multiplicity of individual material layers, which are deposited successively on a lowerable component platform and are subsequently subjected individually to a locally selective solidification process.

In order to make a component by means of selective laser (beam) melting (SLM), a powder bed is irradiated by means of a laser beam according to a predetermined irradiation file, in which the data are generated from a 3D CAD file. In the calculation step, the component is subdivided into individual layers. In the second calculation step, the paths (vectors) along which the laser beam travels are generated for each layer.

Once a powder layer has been irradiated, the component platform is lowered and a new layer of powder is applied by means of a spreader, for example a rake, and then irradiated again with the laser and with the aid of the irradiation file. This is continued until a component has been fully generated. Especially with selective laser beam melting, it is possible to generatively construct components with complex hollow structures.

The surface roughness is determined in this process (normally 20 μm-40 μm) by the method parameters (laser power, beam diameter, movement speed) as well as the particle size fraction of the powder material used. Furthermore, the intensity profile of a laser beam has an intensity distribution which can be described by a bell-shaped profile (Gaussian distribution). This means that the intensity maximum lies at the center of the laser beam and the intensity decreases toward the edges of the laser beam. Because of this, during melting of the powder bed, a temperature maximum is reached on the surface of the powder bed in the middle of the laser beam, the temperature decreasing toward the edge and not being sufficient to melt the particles at the edge. Because of this, in particular, problems are incurred on the surface of the powder bed at the edge of the component cross section to be produced. This is because the laser beam must remain at the edge of the cross section until the edge particles of the component to be produced have been melted. In the vicinity of the edge, namely where the intensity maximum of the laser beam lies, an excessively high amount of energy has however already been delivered at this time. The process is therefore difficult to control, in particular at the edge of the cross section. This gives rise to relatively large averaged roughness depth values $R_z$ (average value of the measured roughness depths) or average roughness values $R_a$ (arithmetic mean of the deviations from the midline). Internally lying surfaces can therefore be reprocessed poorly or not at all after the selective laser melting process.

SUMMARY OF INVENTION

A first object of the invention is therefore to provide a method for producing a component constructed layerwise, in particular a component loaded with high temperatures, which avoids the aforementioned problems. A second object is to provide an improved optical irradiation device for producing a component, which is suitable in particular for carrying out the above method.

According to the invention, the first object is achieved by providing a method for producing a component by successive solidification of individual layers of powdered, granular or liquid material by irradiation with laser radiation with the aid of a laser, each layer being divided into an inner region and an edge region with an edge region surface, and wherein, for each layer, at least the edge region surface of the edge region of the respective layer is irradiated with an ultrashort-pulse laser after the irradiation by the laser.

With an ultrashort-pulse laser (ultrashort-pulse laser beam source), according to the invention the surfaces in the edge regions are structured, or remelted, after each welded layer. Because of the short pulse durations of ultrashort-pulse lasers, only the material which the laser beam strikes directly is affected. By means of this, at least the surface of the edge region is melted deliberately and fully, so that in contrast to the prior art a defined surface structure is obtained in this edge region. Reworking of the component surfaces is thereby avoided. Furthermore, the roughness depth values $R_z$ or average roughness values $R_a$ are improved, i.e. lower, so that an improved surface quality is created in the edge region from the start. In this case, the term edge region may of course also mean edge regions in recesses in the middle of the component.

In a configuration, the entire edge region of the respective layer is irradiated. This may, for example, be achieved through the power of the ultrashort-pulse laser. A defined surface structure is therefore ensured, particularly in the edge region.

Advantageously, the ultrashort-pulse laser emits pulsed laser light with pulse durations in the range of picoseconds and femtoseconds. This is particularly suitable for material processing.

The ultrashort-pulse laser advantageously irradiates the edge region surface at an angle of 30°-45° with respect to this edge region surface. The material processing is therefore carried out at an angle of 30°-45° with respect to the surface, so that the adequacy is improved. If need be, it is therefore also possible to generate structured surfaces, for example surfaces resembling golf balls, surfaces resembling a shark's skin, on internally lying areas. By the invention, the internally lying areas can therefore advantageously be manufactured with a defined flow-optimized surface structure.

Advantageously, the ultrashort-pulse laser as well as the individual layers to be solidified are arranged in a process chamber. The ultrashort-pulse laser is arranged movably through 360° in this process chamber. This ensures that the edge regions, or the edge region surface, can be covered by the ultrashort-pulse laser beam even in the recesses.

According to the invention, the second object is achieved by providing an optical irradiation device for producing a component by successive solidification of individual layers of powdered, granular or liquid material, comprising: —the individual layers to be solidified, each layer being dividable into an inner region and an edge region with an edge region surface, —a laser for irradiating the individual layers, so that the respective irradiated layer can be solidified, —an ultrashort-pulse laser, which irradiates at least the edge region surface of the respective layer after the irradiation of the respective layer by the laser.

In one embodiment, the ultrashort-pulse laser as well as the individual layers to be solidified are arranged in a process chamber. In a configuration, the ultrashort-pulse laser is arranged movably through 360° in this process chamber, so that all edge region surfaces can be reached well with the beam of the ultrashort-pulse laser. This applies, in particular, to recesses. Advantageously, the ultrashort-pulse laser is arranged at an angle of 30°-45° with respect to the edge region surface.

The advantages of the method can also be transferred to the optical irradiation device: the surfaces in the edge regions are structured or remelted after each pass with an ultrashort-pulse laser. The ultrashort-pulse laser is integrated into the process chamber so as to be movable through 360° therein. The material processing takes place at an angle of 30°-45° with respect to the surface. If need be, it is therefore also possible to generate structured surfaces (golf ball, shark's skin) on internally lying areas.

Advantageously, the optical irradiation device is suitable for carrying out the method described above.

BRIEF DESCRIPTION OF THE DRAWINGS

Other features, properties and advantages of the present invention may be found in the following description with reference to the appended figures, in which, schematically.

DETAILED DESCRIPTION OF INVENTION

Figure 1:
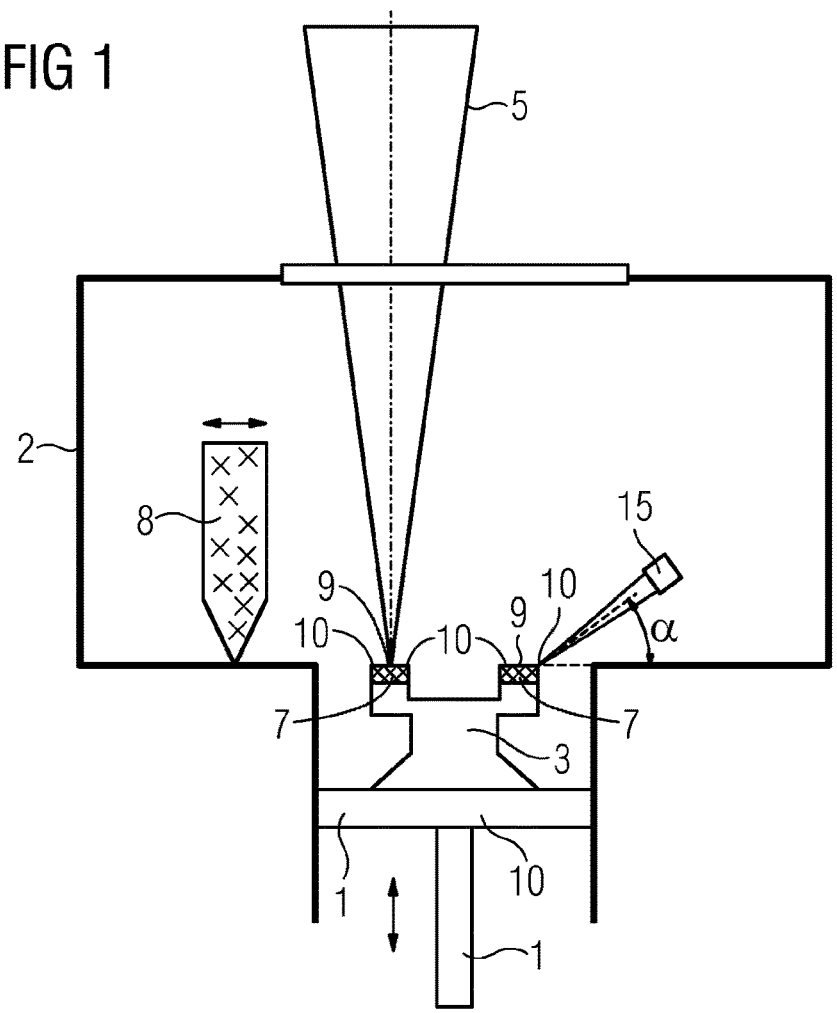
FIG. 1 schematically shows the device according to the invention

FIG. 1 schematically shows the device according to the invention for the layerwise generation of components. In this case, the optical irradiation device according to the invention comprises a component platform 1. This may be arranged in a process chamber 2. The component platform 1 may be displaceable, or lowerable. By means of a powder application device 8, a powder layer 7 is now applied onto the component platform 1. Of course, other material layers, for example of granular or liquid material, may also be applied and solidified. In this case, the semifinished component 3 to be generated may also be arranged on the component platform 1. In this case, the powder layer 7 is applied at least onto the semifinished component 3 which is arranged on the lowered component platform 1. As a solidifier, the device furthermore comprises a laser 5, which may also be arranged outside the process chamber 2. The laser 5 now locally melts the powder, which subsequently solidifies and bonds to the layer lying underneath. Each layer has an inner region with an inner region surface 9 and an edge region with an edge region surface 10. According to the invention, for each layer, after the irradiation or solidification by the laser 5, at least the edge region surface 10 of the edge region of the respective layer just irradiated is irradiated with an ultrashort-pulse laser 15. The ultrashort-pulse laser 15 emits pulsed laser light with pulse durations in the range of picoseconds and femtoseconds. The ultrashort-pulse laser 15 irradiates the edge region surface 10 of the edge region at an angle $\alpha=30°-45°$ with respect to this edge region surface. In order to reach all edge region areas 10, i.e. in particular those which lie internally on recesses in the component 3, the ultrashort-pulse laser 15 is arranged movably through 360° in this process chamber 2.

Figure 2:
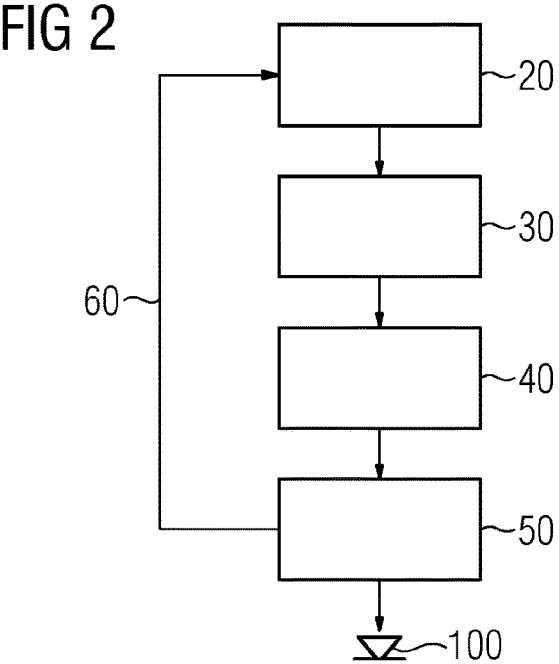
FIG. 2 schematically shows the method.

FIG. 2 schematically shows the method according to the invention. In this case, a component platform 1 (FIG. 1) is initially provided for the component 3 to be generated (FIG. 1) 20. A new powder layer 7 (FIG. 1) is subsequently applied onto the component platform 1 (FIG. 1), or onto the previous solidified and unsolidified powder layers (powder bed) 30. In this case, the powder layer 7 (FIG. 1) may be applied by a powder application device 8 (FIG. 1). The applied powder layer 7 (FIG. 1) is locally irradiated, or solidified, with a laser 5 (FIG. 1) with the aid of an irradiation file 40. Subsequently, the irradiated layer is irradiated in the edge region surfaces 10 with an ultrashort-pulse laser 15 (FIG. 1). By means of this, the edge region surface 10 is remelted or may even be structured 50. The method ends when the component 3 has been fully constructed layerwise 100. Otherwise, the method starts again 60.

In this way, at least the edge region surface 10 is deliberately and fully melted. The roughness depth values $R_z$ or average roughness values $R_a$ are thereby improved, i.e. lower, so that an improved, i.e. defined, surface structure is created in the edge region from the beginning. Reprocessing of the component surface is thereby avoided. By the invention, the internally lying areas can therefore also be manufactured with a defined, flow-optimized surface structure. If need be, it is also possible to generate structured surfaces (golf ball, shark's skin) on internally lying areas.

The invention claimed is:

1. A production method for a component comprising:
   applying a layer of material;
   melting the layer of material by irradiation with laser radiation from a first laser;
   allowing the melted material to solidify to form a first layer of the component;
   the first layer being divided into an inner region and an edge region with an edge region surface having a first roughness value, and
   before an addition of any supplemental material or successive layer, at least the edge region surface of the edge region of the first layer is remelted with an ultrashort-pulse laser after the irradiation by the laser radiation from the first laser to achieve a roughness value lower than the first roughness value upon resolidification of the edge region surface; and
   iteratively repeating the above steps to form successive layers of the component.

2. The production method as claimed in claim 1, wherein an entirety of the edge region of the first layer is irradiated.

3. The production method as claimed in claim 1,
wherein the ultrashort-pulse laser emits pulsed laser light with pulse durations in the range of picoseconds or femtoseconds.

4. The production method as claimed in claim 1,
wherein the ultrashort-pulse laser is arranged at an angle (α) of 30°-45° with respect to the edge region surface.

5. The production method as claimed in claim 1,
wherein the ultrashort-pulse laser as well as the layers are arranged in a process chamber, and the ultrashort-pulse laser is arranged movably through 360° in the process chamber.

6. An optical irradiation device for producing a component by successive melting and solidification of individual layers of material, each layer being dividable into an inner region and an edge region with an edge region surface, the optical irradiation device comprising:
a first laser configured for irradiating and melting respective individual layers of material which then solidify to form a respective layer of the component, and
a second laser, different from the first laser, the second laser being an ultrashort-pulse laser, configured to irradiate at least the edge region surface of a respective layer after the irradiation of the respective layer by the first laser,
wherein the ultrashort-pulse laser as well as the individual layers are arranged in a process chamber.

7. The optical irradiation device as claimed in claim 6,
wherein the ultrashort-pulse laser is arranged movably through 360° in the process chamber.

8. The optical irradiation device as claimed in claim 6,
wherein the ultrashort-pulse laser is arranged at an angle (α) of 30°-45° with respect to the edge region surface.

9. The optical irradiation device as claimed claim 6,
wherein the optical irradiation device is adapted to produce a component by:
successive solidification of individual layers of material by irradiation with laser radiation from the first laser, each layer being divided into an inner region and an edge region with an edge region surface having a first roughness value,
wherein for each layer, at least the edge region surface of the edge region of the respective layer is remelted with the ultrashort-pulse laser after the irradiation by the laser radiation from the first laser and before addition of any successive layer to achieve a roughness value lower than the first roughness value upon resolidification of the edge region surface.

10. A production method for a component comprising:
applying a layer of material;
melting the layer of material with a laser beam and allowing the melted material to solidify to form a layer of the component having a surface exhibiting a first roughness characteristic; and
remelting an edge region of the surface with an ultrashort-pulse laser beam before applying any supplemental material or successive layer and allowing the remelted edge region surface to resolidify to achieve a roughness characteristic different from the first roughness characteristic.

* * * * *